US008132068B2

United States Patent
Jiang

(10) Patent No.: US 8,132,068 B2
(45) Date of Patent: Mar. 6, 2012

(54) DUAL RECEIVING WINDOW METHOD AND APPARATUS FOR AUTOMATIC RETRANSMISSION REQUEST

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 1285 days.

(21) Appl. No.: 11/806,502

(22) Filed: May 31, 2007

(65) Prior Publication Data

US 2007/0280191 A1 Dec. 6, 2007

Related U.S. Application Data

(60) Provisional application No. 60/803,712, filed on Jun. 1, 2006.

(51) Int. Cl.
*G08C 25/02* (2006.01)
*H04L 1/18* (2006.01)

(52) U.S. Cl. .................................................. 714/748

(58) Field of Classification Search .............. 714/748, 714/746, 776; 370/345, 310, 394, 94.2, 94.3, 370/902
See application file for complete search history.

(56) References Cited

U.S. PATENT DOCUMENTS

| 4,970,714 A | 11/1990 | Chen et al. | |
|---|---|---|---|
| 6,018,516 A * | 1/2000 | Packer | 370/231 |
| 6,925,502 B1 * | 8/2005 | Abbasi et al. | 709/232 |
| 7,373,417 B1 * | 5/2008 | Abbasi et al. | 709/232 |
| 8,018,945 B2 * | 9/2011 | Zhang et al. | 370/394 |
| 2005/0243831 A1 * | 11/2005 | Zhang et al. | 370/394 |
| 2007/0177630 A1 * | 8/2007 | Ranta et al. | 370/473 |

FOREIGN PATENT DOCUMENTS

| JP | S6362435 A | 3/1988 |
|---|---|---|
| JP | H2228147 A | 9/1990 |
| JP | H311851 A | 1/1991 |
| JP | H4229746 A | 8/1992 |
| JP | 6-46037 | 2/1994 |
| JP | H1032584 A | 2/1998 |
| JP | 2002527936 A | 8/2002 |
| KR | 10-2002-0038376 | 5/2002 |
| KR | 10-2002-0093543 | 12/2002 |
| KR | 2003-0038020 | 5/2003 |
| WO | 0021233 A2 | 4/2000 |

OTHER PUBLICATIONS

3GPP TS 25.321 V7.0.0 (Mar. 2006) "Medium Access Control (MAC) protocol specification (Release 7)".
3GPP TS 25.322 V7.0.0 (Mar. 2006) Radio Link Control (RLC) protocol specification (Release 7).
Office Action on corresponding TW patent application No. 096119508 from TIPO issued on Mar. 14. 2011, (No English Translation).

* cited by examiner

*Primary Examiner* — Phung M Chung
(74) *Attorney, Agent, or Firm* — Klein, O'Neill & Singh, LLP

(57) ABSTRACT

A method for enhancing data transmission efficiency in a wireless communications system includes using a first receiving window and a second receiving window in a receiver side of an entity operating in Acknowledgement Mode, wherein the first receiving window provides a function of Automatic Retransmission Request and the second receiving window is utilized for detecting missing Sequence Numbers.

16 Claims, 4 Drawing Sheets

DUAL RECEIVING WINDOW METHOD AND APPARATUS FOR AUTOMATIC RETRANSMISSION REQUEST

CROSS REFERENCE TO RELATED APPLICATIONS

This application claims the benefit of U.S. Provisional Application No. 60/803,712, filed on Jun. 1, 2006 and entitled "Dual Receiving Window Method and Apparatus for Automatic Retransmission Request", the contents of which are incorporated herein by reference.

BACKGROUND OF THE INVENTION

1. Field of the Invention

The present invention relates to a method and apparatus for enhancing data transmission efficiency in a wireless communications system, and more particularly to a method and apparatus capable of decreasing delay of a NACK status report, so as to enhance the data transmission efficiency.

2. Description of the Prior Art

To enhance transmission efficiency and reliability, a traditional wireless communications system comprises an Automatic Retransmission Request (ARQ) function, and a sliding window can be used for ARQ operations. There are two types of the sliding window, Push Type and Pull Type. The Push Type window is advanced only when a packet corresponding to the lower edge of the window is received successfully or is informed to be discarded. When a packet with SN (sequence number) outside the Push Type window is received, the packet is discarded. Therefore, the Push Type window is generally used in a receiver, such as an AM RLC entity in UMTS (Universal Mobile Telecommunications System), to provide ARQ function as specified in Radio Link Control (RLC) protocol specification, 3GPP TS 25.322 V7.0.0, developed by the 3rd Generation partnership Project (3GPP).

In comparison, the Pull Type window is advanced when a packet with an SN outside the window is received and the SN is set to be the updated upper edge of the Pull Type window. If any missing SN in the window is moved below the lower edge of the Pull Type window, i.e., outside the Pull Type window, due to the window advancement, the missing SN is neglected. Therefore, the Pull Type window is generally used in a receiver, where no ARQ function is needed, such as a reordering entity in a High Speed Downlink Packet Access (HSDPA) system, to support in-sequence delivery, as specified in Medium Access Control (MAC) specification, 3GPP TS 25.321 V7.0.0, developed by the 3rd Generation partnership Project (3GPP).

In addition, for both the Push Type and the Pull Type windows, the window sizes are kept constant unless they are reconfigured to new values. For an entity, only one type of sliding window is used.

In a wireless communications system, such as Long Term Evolution (LTE) or System Architecture Evolution (SAE) systems, which supports PS transportation only, the system architecture can be simpler than a system, such as UMTS, which supports both circuit-switched (CS) and PS transportation. In such a simplified system, Radio Link Control (RLC) and Media Access Control (MAC) layers can be combined into one layer. Since only one type of sliding window is used for an entity, the transmission efficiency will be decreased.

Firstly, the RLC entity uses Push Type window for performing ARQ function. When an SN is found missing (e.g., a later SN is received before the missing one), the RLC entity reports a negative acknowledgement (NACK) in a status report to request the peer entity for a retransmission. Besides, the MAC entity can retransmit packets through Hybrid Automatic Repeat Request (HARQ), which triggers retransmission according to positive/negative acknowledgement signals (ACK/NACK) transmitted from an HARQ process in a receiving end. The HARQ process combines unsuccessfully decoded data to generate correct packets, so that transmission efficiency can be increased. However, due to such property, a packet may arrive the receiver before another packet transmitted before the packet. Therefore, while the RLC entity transmits a status report to request the transmitter for retransmission of a missing packet, the MAC entity may get the missing packet through HARQ processes. Thus, unnecessary retransmission is performed and radio resource is wasted.

Therefore, a mechanism is required for the RLC entity to effectively detect whether an HARQ PDU (Protocol Data Unit) is lost or is under a retransmission procedure, so as to timely request for retransmission. A straightforward solution is to use a timer mechanism. When a missing SN is detected, a timer is started. The NACK status report will not be sent out before the timer expires. This can avoid pre-matured NACK status report and the unnecessary retransmission if duration of the timer is configured properly. However, HARQ is an asynchronous ARQ technology, meaning that time of completion of packet retransmission in HARQ is varied due to different transmission environment or conditions, so that proper timer duration is not easy to be configured. The timer duration need be configured long enough to cover the worst case of all the conditions that may happen to the HARQ processes. Therefore, a NACK status report may be delayed because of the timer duration configuration. This will deteriorate the data transmission efficiency.

SUMMARY OF THE INVENTION

According to the present invention, a method for enhancing data transmission efficiency in a wireless communications system comprises using a first receiving window and a second receiving window in a receiver side of an entity operating in Acknowledgement Mode, wherein the first receiving window provides a function of Automatic Retransmission Request and the second receiving window is utilized for detecting missing Sequence Numbers.

According to the present invention, a communications device of a wireless communications system utilized for enhancing data transmission efficiency comprises a control circuit for realizing functions of the communications device, a central processing unit installed in the control circuit for executing a program code to operate the control circuit, and a memory coupled to the central processing unit for storing the program code. The program code comprises using a first receiving window and a second receiving window in a receiver side of an entity operating in Acknowledgement Mode, wherein the first receiving window provides a function of Automatic Retransmission Request and the second receiving window is utilized for detecting missing Sequence Numbers.

According to the present invention, a method for enhancing data transmission efficiency in a wireless communications system comprises using a first transmitting window and a second transmitting window in a transmitter side of an entity operating in Acknowledgement Mode, wherein the first transmitting window provides a function of Automatic Retransmission Request and the second transmitting window provides a function of Hybrid Automatic Repeat Request.

According to the present invention, a communications device of a wireless communications system utilized for enhancing data transmission efficiency comprises a control circuit for realizing functions of the communications device, a central processing unit installed in the control circuit for executing a program code to operate the control circuit, and a memory coupled to the central processing unit for storing the program code. The program code comprises using a first transmitting window and a second transmitting window in a transmitter side of an entity operating in Acknowledgement Mode, wherein the first transmitting window provides a function of Automatic Retransmission Request and the second transmitting window provides a function of Hybrid Automatic Repeat Request.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
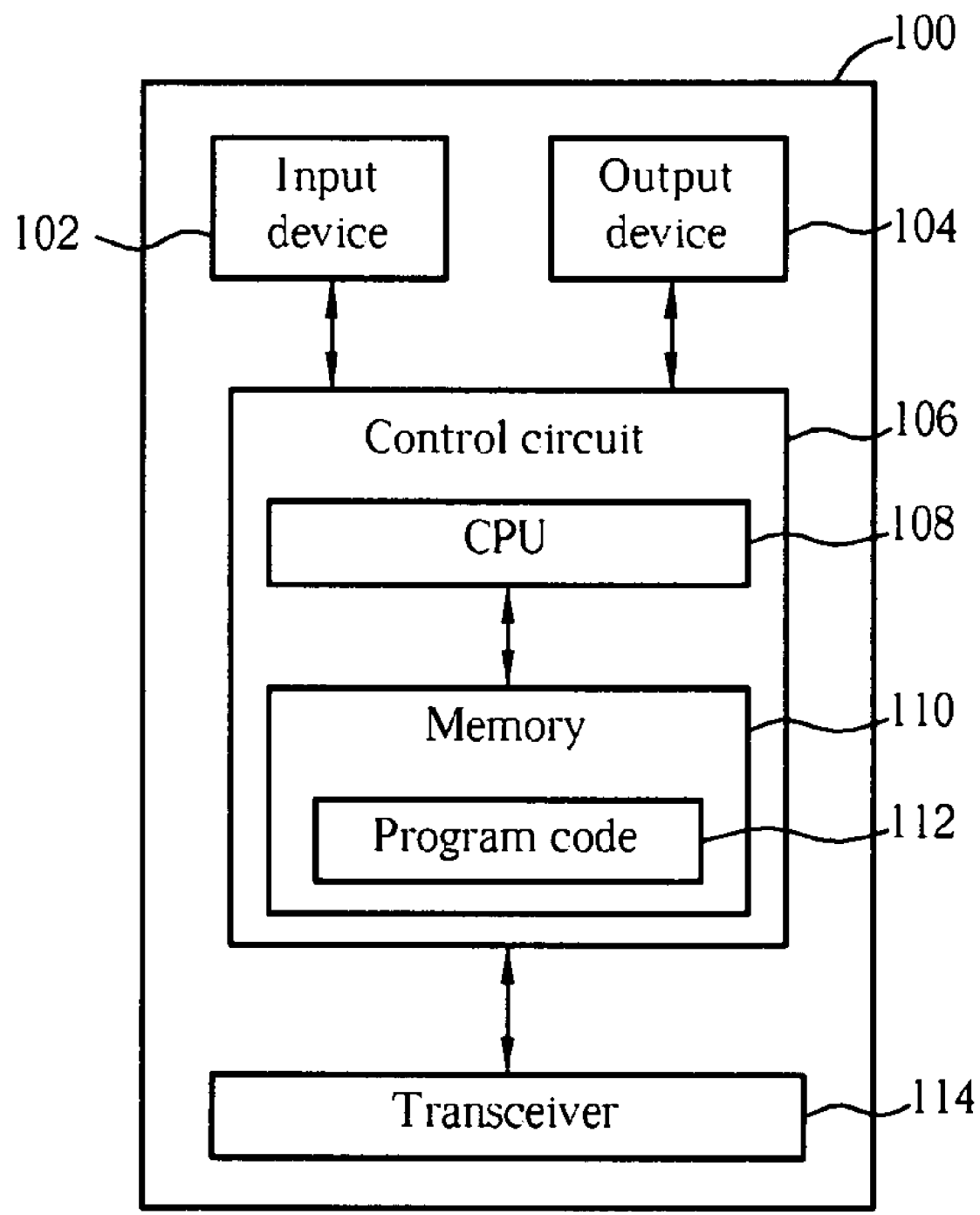
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
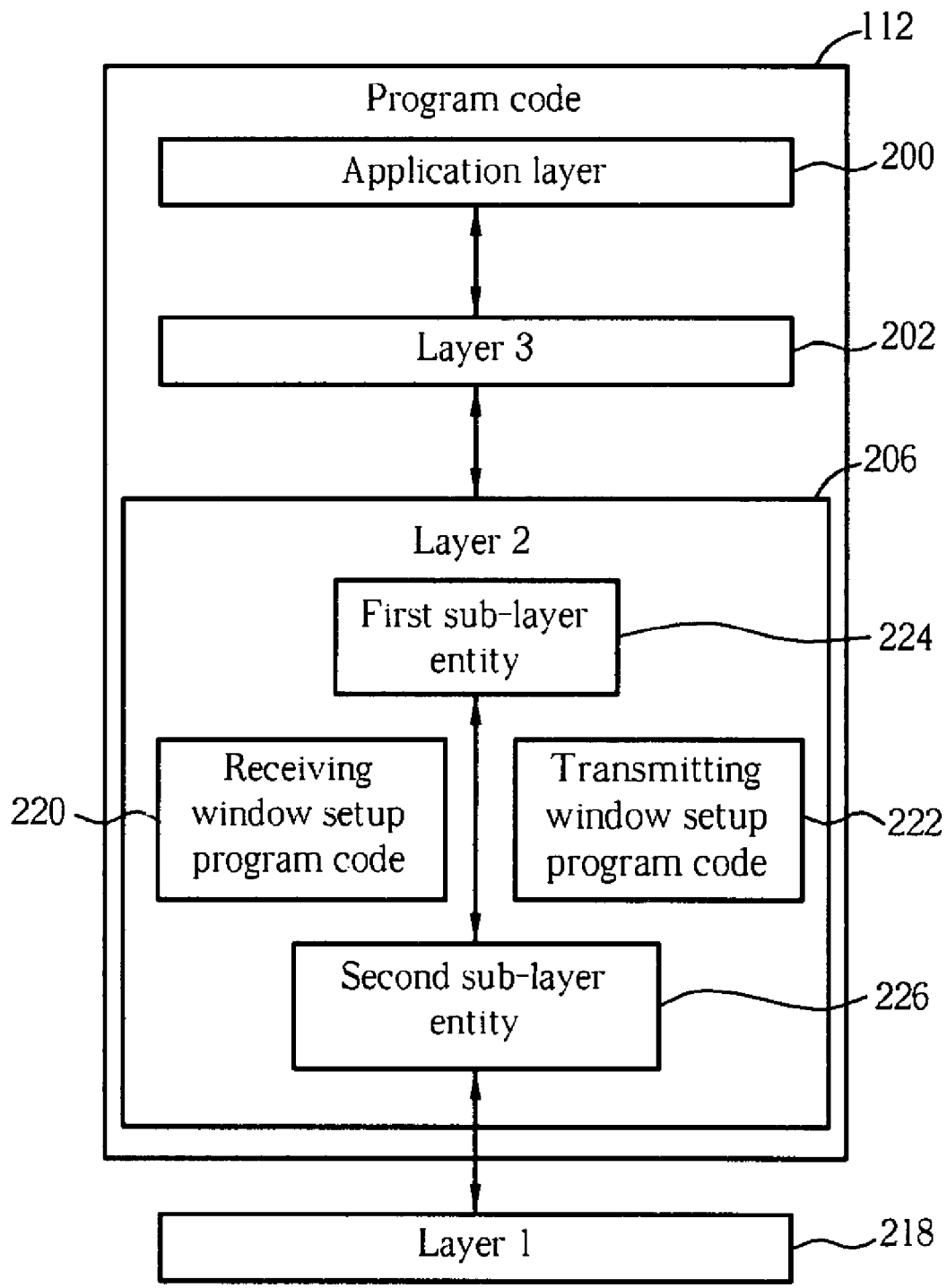
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, ciphering, sequence check, and duplication detection on transmitted data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Figure 3:
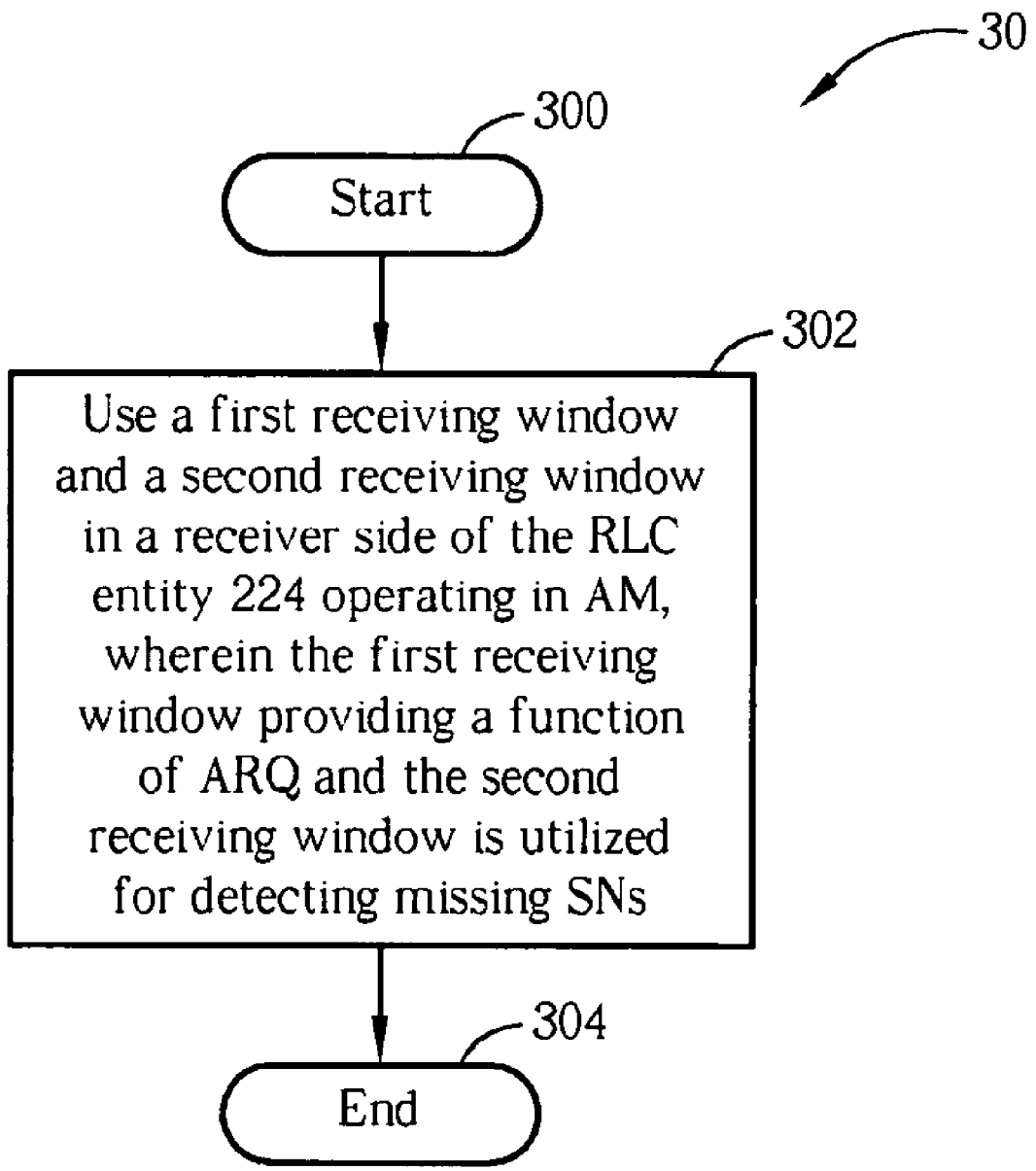
FIG. 3 is a flowchart diagram of a process according to the first embodiment of the present invention.

In an advanced wireless communications system, such as LTE or SAE, which supports PS transportation only, the system architecture is simpler, so that the RLC entity 224 and the MAC entity 226 can be combined into one entity. In this situation, the present invention provides a receiving window setup program code 220 and a transmitting window setup program code 222 utilized for configuring a receiving window and a transmitting window of the Layer 2 206, in order to timely trigger packet retransmissions, and reduce transmission delay and avoid radio resource waste. Please refer to FIG. 3, which illustrates a schematic diagram of a process 30 according to the first embodiment of the present invention. The process 30 is utilized for enhancing data transmission efficiency in a wireless communications system, and can be complied into the receiving window setup program code 220. The process 30 comprises the following steps:

Step 300: Start.

Step 302: Use a first receiving window and a second receiving window in a receiver side of the RLC entity 224 operating in Acknowledgement Mode (AM), wherein the first receiving window providing a function of ARQ and the second receiving window is utilized for detecting missing SNs.

Step 304: End.

According to the process 30, the first embodiment of the present invention uses the first receiving window and the second receiving window for providing a function of ARQ and for detecting missing SNs respectively in the receiver side of the RLC entity 224 when operating in AM. In the preferred embodiment of the present invention, the first receiving window is a Push Type sliding window, which is advanced only when a packet corresponding to a lower edge of the first receiving window is received successfully or is informed to be discarded, and a received packet with an SN outside the first receiving window is discarded. Preferably, the second receiving window is a Pull Type sliding window, which is advanced when a packet with an SN inside the first receiving window and outside the second receiving window is received and the SN is set to be the updated upper edge of the second receiving window, and if an SN in the second receiving window that is not received is moved below the lower edge of the second receiving window due to the advancement of the second receiving window, the SN is detected as a missing SN. In addition, the size of the first receiving window is preferably greater than or equal to that of the second receiving window.

Therefore, via the process 30, when the second receiving window detects a missing SN, the RLC entity 224 can transmit a NACK status report to the transmitter for retransmission of a packet corresponding to the missing SN. As a result, the NACK status report will not be delayed, and the data transmission efficiency can be enhanced accordingly.

Figure 4:
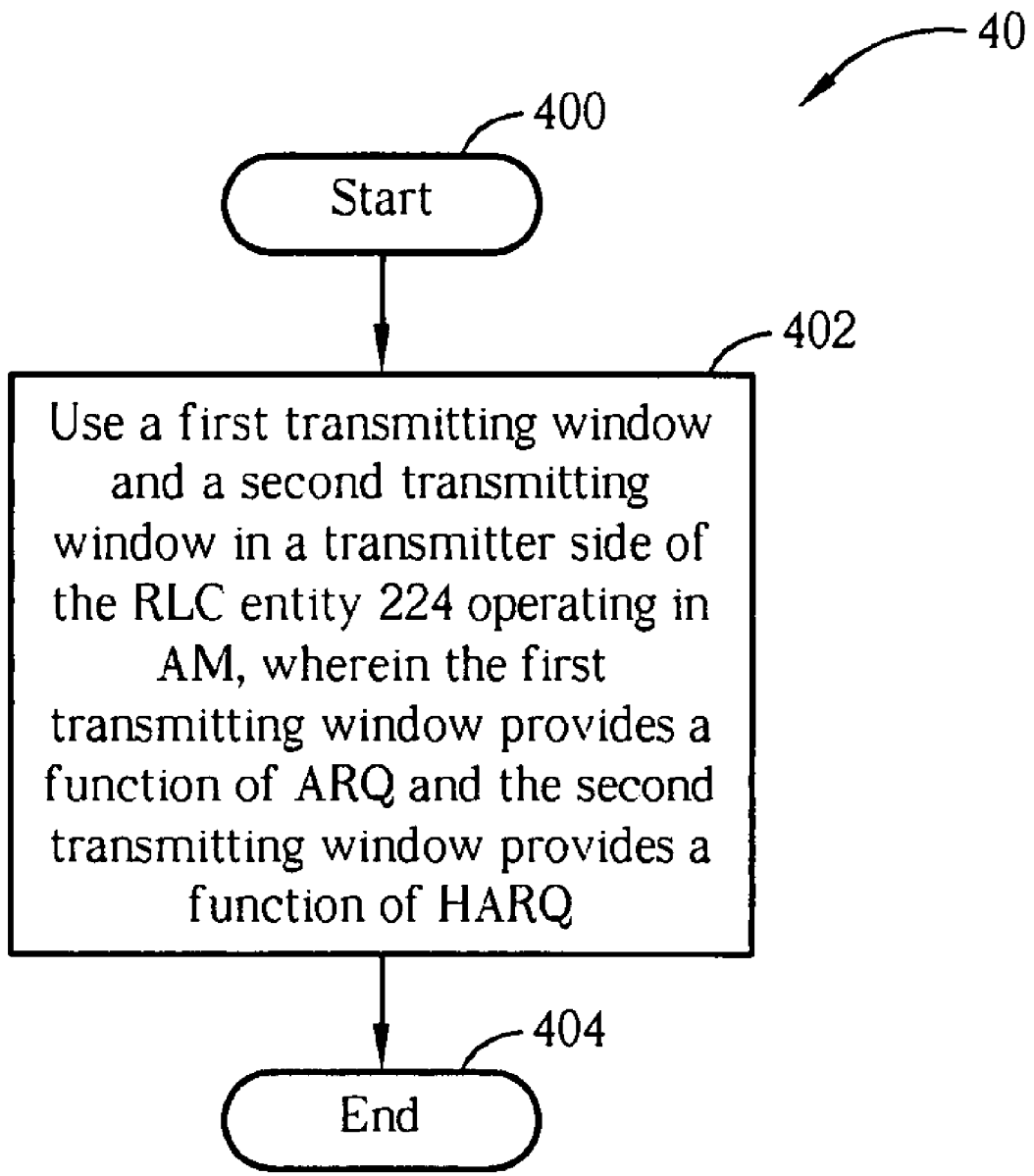
FIG. 4 is a flowchart diagram of a process according to the second embodiment of the present invention.

Please refer to FIG. 4, which illustrates a schematic diagram of a process 40 according to the second embodiment of the present invention. The process 40 is utilized for enhancing data transmission efficiency in a wireless communications system, and can be complied into the transmitting window setup program code 222. The process 40 comprises the following steps:

Step 400: Start.

Step 402: Use a first transmitting window and a second transmitting window in a transmitter side of the RLC entity 224 operating in AM, wherein the first transmitting window provides a function of ARQ and the second transmitting window provides a function of HARQ.

Step 404: End.

According to the process 40, the second embodiment of the present invention uses the first transmitting window and the second transmitting window for ARQ and HARQ respectively in the transmitter side of the RLC entity 224 when operating in AM. In the preferred embodiment of the present invention, the first and second transmitting windows are advanced when packets corresponding to lower edges of the first and second transmitting windows are positively acknowledged or decided to be discarded. Whether a packet is positively acknowledged is determined according to a status report sent from a peer receiving entity or a local acknowledgement sent from the lower layer, the MAC entity 226. In addition, the size of the first transmitting window is preferably greater than or equal to that of the second transmitting window.

Therefore, the process 40 uses at least two transmitting windows for ARQ and HARQ in the transmitter side of the AM RLC entity 224, so as to timely retransmit packets.

In summary, the first embodiment of the present invention uses at least two receiving windows in the receiver side of the AM RLC entity for providing ARQ function and detecting missing SNs, so as to decrease delay of the NACK status report, and enhance the data transmission efficiency accordingly. Conversely, the second embodiment of the present invention uses at least two transmitting windows in the transmitter side of the AM RLC entity for ARQ and HARQ, so as to timely retransmit packets.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enhancing data transmission efficiency in a wireless communications system comprising:
   using a first receiving window and a second receiving window in a receiver side of an entity operating in Acknowledgement Mode (AM);
   wherein the first receiving window provides a function of Automatic Retransmission Request (ARQ) and the second receiving window is utilized for detecting missing Sequence Numbers (SNs);
   wherein the first receiving window, is a Push Type sliding window, which is advanced only when a packet corresponding to a lower edge of the Push Type sliding window is received successfully or is informed to be discarded, and a packet with an SN outside the Push Type sliding window is discarded;
   wherein the second receiving window is a Pull Type sliding window, which is advanced when a packet with a first SN inside the first receiving window and outside the Pull Type sliding window is received;
   wherein the first SN is set to be an updated upper edge of the Pull Type window; and
   wherein if a second SN in the Pull Type sliding window that is not received is moved below the lower edge of the Pull Type sliding window due to the advancement of the Pull Type sliding window, the second SN is detected as a missing SN.

2. The method of claim 1 further comprising the entity requesting a transmitter for retransmission of packets corresponding to missing SNs detected by the second receiving window.

3. The method of claim 1, wherein the size of the first receiving window is greater than or equal to that of the second receiving window.

4. The method of claim 1, wherein the entity is a Radio Link Control entity.

5. A communications device of a wireless communications system utilized for enhancing data transmission efficiency comprising:
   a control circuit for realizing functions of the communications device:
   a central processing unit installed in the control circuit for executing a program code to operate the control circuit; and
   a memory coupled to the central processing unit for storing the program code;
   wherein the program code comprises:
       using a first receiving window and a second receiving window in a receiver side of an entity operating in Acknowledgement Mode (AM);
       wherein the first receiving window provides a function of Automatic Retransmission Request t ARQ) and the second receiving window is utilized for detecting missing Sequence Numbers (SNs);
       wherein the first receiving window is a Push Type sliding window, which is advanced only when a packet corresponding to a lower edge of the Push Type sliding window is received successfully or is informed to be discarded, and a packet with an SN outside the Push Type sliding window is discarded;
       wherein the second receiving window is a Pull Type sliding window, which is advanced when a packet with a first SN inside the first receiving window and outside the Pull Type sliding window is received;
       wherein the first SN is set to be an updated upper edge of the Pull Type window; and
       wherein if a second SN in the Pull Type sliding window that is not received is moved below the lower edge of the Pull Type sliding window due to the advancement of the Pull Type sliding window, the second SN is detected as a missing SN.

6. The communications device of claim 5, wherein the program code further comprises the entity requesting a transmitter for retransmission of packets corresponding to missing SNs detected by the second receiving window.

7. The communications device of claim 5, wherein the size of the first receiving window is greater than or equal to that of the second receiving window.

8. The communications device of claim 5, wherein the entity is a Radio Link Control entity.

9. A method for enhancing data transmission efficiency in a wireless communications system comprising:
   using a first transmitting window and a second transmitting window in a transmitter side of an entity operating in Acknowledgement Mode (AM);
   wherein the first transmitting window provides a function of Automatic Retransmission Request (ARQ) and the second transmitting window provides a function of Hybrid Automatic Repeat Request (HARQ);
   determining whether a packet corresponding to a lower edge of the first transmitting window is positively acknowledged according to a status report sent from a peer receiving entity or a local acknowledgement sent from a lower layer entity of the entity;
   wherein the first transmitting window is advanced when the packet corresponding to the lower edge of the first transmitting window is positively acknowledged or is decided to be discarded; and wherein the second transmitting window is advanced when a packet corresponding to a lower edge of the second transmitting window is positively acknowledged or is decided to be discarded.

10. The method of claim 9 further comprising determining whether the packet corresponding to the lower edge of the second transmitting window is positively acknowledged according to a status report sent from a peer receiving entity or a local acknowledgement sent from a lower layer entity of the entity.

11. The method of claim 9, wherein the size of the first transmitting window is greater than or equal to that of the second transmitting window.

12. The method of claim 9, wherein the entity is a Radio Link Control entity.

13. A communications device of a wireless communications system utilized for enhancing data transmission efficiency comprising:
- a control circuit for realizing functions of the communications device;
- a central processing unit installed in the control circuit for executing a program code to operate the control circuit: and
- a memory coupled to the central processing unit for storing the program code: wherein the program code comprises:
  using a first transmitting window and a second transmitting window in a transmitter side of an entity operating in Acknowledgement Mode (AM);
  wherein the first transmitting window provides a function of Automatic Retransmission Request (ARQ) and the second transmitting window provides a function of Hybrid Automatic Repeat Request (HARQ);
  determining whether a packet corresponding to a lower edge of the first transmitting window is positive acknowledged according to a status report sent from a peer receiving entity or a local acknowledgement sent from a lower layer entity of the entity;
  wherein the first transmitting window is advanced when the packet corresponding to the lower edge of the first transmitting window is positively acknowledged or is decided to be discarded; and
  wherein the second transmitting window is advanced when a packet corresponding to a lower edge of the second transmitting window is positively acknowledged or is decided to be discarded.

14. The communications device of claim 13, wherein the program code further comprises determining whether the packet corresponding to the lower edge of the second transmitting window is positively acknowledged according to a status report sent from a peer receiving entity or a local acknowledgement sent from a lower layer entity of the entity.

15. The communications device of claim 13, wherein the size of the first transmitting window is greater than or equal to that of the second transmitting window.

16. The communications device of claim 13, wherein the entity is a Radio Link Control entity.

* * * * *